United States Patent
Avner et al.

(10) Patent No.: US 6,643,753 B2
(45) Date of Patent: Nov. 4, 2003

(54) METHODS AND SYSTEMS FOR MANAGING HEAP CREATION AND ALLOCATION

(75) Inventors: Jon B. Avner, Bellevue, WA (US); Soner Terek, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/769,629

(22) Filed: Jan. 25, 2001

(65) Prior Publication Data

US 2002/0099918 A1 Jul. 25, 2002

Related U.S. Application Data

(60) Provisional application No. 60/238,109, filed on Oct. 4, 2000.

(51) Int. Cl.[7] ............................................. G06F 12/00
(52) U.S. Cl. ..................... 711/170; 711/173; 711/203
(58) Field of Search ................. 711/170, 173, 711/203

(56) References Cited

U.S. PATENT DOCUMENTS

| | | | | |
|---|---|---|---|---|
| 5,809,554 A | * | 9/1998 | Benayon et al. | 711/170 |
| 6,249,852 B1 | * | 6/2001 | Benayon et al. | 711/170 |
| 6,275,916 B1 | * | 8/2001 | Weldon et al. | 711/170 |
| 6,363,468 B1 | * | 3/2002 | Allison | 711/173 |

FOREIGN PATENT DOCUMENTS

WO    WO-95/16957 A1 * 6/1995 ........... G06F/12/02

OTHER PUBLICATIONS

Sun Microsystems, "The Java Virtual Machine Specification", Aug. 16, 2000, Chapter 3, http://web.archive.org/web/20000816180608/http://java.sun.com/docs/books/vmspec/html/Overview.doc.html Version and Date obtained throug Way Back Machine (www.archive.org).*

IBM, "C for AIX; online information" 1998, http://usgibm.nersc.gov/vac Memory Management Functions Section.*

Gustavo Rodriguez–Rivera, Michael Spertus, & Charles Fiterman "A Non–Fragmenting Non–Moving, Garbage Collector" ACM SIGPLAN, Mar. 1999, vol. 34, No. 3, pp. 79–85.

* cited by examiner

Primary Examiner—Donald Sparks
Assistant Examiner—Paul Baker
(74) Attorney, Agent, or Firm—Workman, Nydegger

(57) ABSTRACT

The present invention increase the efficiency of virtual memory usage when performing heap allocation and reduces virtual memory fragmentation caused by heap allocation. Instead of incrementally growing the initial heaps when there is not enough heap memory to make an allocation, an entirely new heap is created in which to make the allocation. That new heap may be added to the pool of heaps from which an allocation may be made. The additional heaps are of a constant, relatively large, size thereby reducing the risk of virtual memory fragmentation.

22 Claims, 4 Drawing Sheets

METHODS AND SYSTEMS FOR MANAGING HEAP CREATION AND ALLOCATION

CROSS-REFERENCE TO RELATED APPLICATION

This application claims the benefit under 35 U.S.C. 119(e) of co-pending U.S. provisional application serial No. 60/238,109, filed Oct. 4, 2000 and entitled "IMPROVEMENT TO EXCHMEM", which application is incorporated herein by reference in its entirety.

BACKGROUND OF THE INVENTION

1. The Field of the Invention

The present invention relates to the field of memory management. In particular, the present invention relates to the methods and systems for managing heap creation and allocation in a manner that improves memory usage and reduces the risk of virtual memory fragmentation.

2. Background and Related Art

Computers have transformed the lives of many in this modern era. The ability to store and retrieve instructions and data is fundamental to computer operation. Modern computer systems access physical memory through a virtual memory manager that maps virtual memory addresses to physical memory addresses. During run time, applications identify the virtual memory address that is to be operated on. Typical operations might include reading information from the identified virtual memory address, writing information to that address, allocating the address, releasing the address for further use, and so forth. The virtual memory manager then converts the virtual memory address into a corresponding physical memory so that the appropriate operation may be performed on the appropriate physical address.

The amount of available virtual memory is not limited to the amount of available physical memory. When the physical memory is full, the virtual memory manager transfers or "pages" some of the memory contents to disk. When a virtual memory address that has been paged to disk is accessed, the virtual memory manager loads the corresponding information from the disk back into the physical memory. The process of transferring memory between the physical memory and the disk is called "swapping". This process allows the virtual memory to be much larger than the physical memory.

The number of virtual memory addresses is, however, limited by the bit size of the address space used to address virtual memory. For example, in an operating system that uses 32-bit virtual memory addressing, the number of virtual memory addresses is limited to $2^{32}$ or 4 Gig, where 1 Gig is equal to 1024 Meg, where 1 Meg is equal to $2^{20}$ or 1,048,576. Since each address contains one byte of information, the virtual memory size is limited to 4 Gigabytes (GB). Typically, an operating system will internally reserve 1 or 2 GB of virtual memory for the operating system leaving only 2 or 3 GB of virtual memory for non-system processes to use. While this may seem like a lot of memory, as software applications are becoming more complex, virtual memory allocations may use the entire available virtual memory.

The virtual memory manager allocates virtual memory segments at a relatively large granularity. In this description and in the claims, a "virtual memory segment" is defined as a group of contiguous virtual memory addresses. For example, a typical granularity of a virtual memory segment allocated by the virtual memory manager is 64 kilobytes (KB). In this case, the smallest virtual segment that could be allocated by the virtual memory manager would be 64 KB. However, many applications require much less virtual memory than 64 KB. It would be an inefficient usage of virtual memory to allocate an entire segment of 64 KB for an application that requires much less than 64 KB of virtual memory since a large portion of the 64 KB would remain unused. For example, if the application only needed 2 KB of virtual memory, 62 KB of the virtual memory segment would remain unused.

Conventional heap managers allow for the allocation of virtual memory segments at a much finer granularity. A typical heap manager may allocate segments in a heap at a granularity of merely 8 bytes. In order to accomplish a more efficient usage of virtual memory, a heap manager instructs the virtual memory manager to allocate a relatively large virtual memory segment called a "heap". As various applications require relatively small allocations of virtual memory, the heap manager makes the relatively small allocation of virtual memory from within the relatively large heap. The heap manager then keeps track of the location of the smaller segments within the larger heap as well as the process associated with that smaller allocation.

The conventional heap manager is very helpful in allowing for the more efficient use of memory space since the heap manager may allocate smaller increments of virtual memory within a heap. However, whenever a thread performs an allocation, a reallocation, or a deallocation of virtual memory within the heap, the entire heap is locked thereby prohibiting memory operations by other threads that also would use the heap. This locking operation often forces threads to wait until the heap is unlocked before operating on the heap.

One improvement to this conventional heap manager is implemented by a heap optimization module that causes the heap manager to create more than one heap. For example, the heap optimization module may cause the heap manager to create three more heaps than the number of processors in the system. Thus, in a two-processor system, the heap optimization module would cause the heap manager to create five heaps.

If a thread is to make a smaller allocation within a heap, the heap optimization module determines which heap is to receive the allocation. Specifically, the heap optimization module identifies a heap that is not locked. Then, the heap optimization module locks the identified heap and instructs the heap manager to make the smaller allocation in the identified heap. After the heap manager responds to the instruction by reporting the success or failure of the instructed allocation, the heap optimization module unlocks the identified heap. Thus, even if one of the heaps is locked, other threads may continue to make allocations within other unlocked heaps. In this manner, the heap optimization module distributes allocation to one of multiple heaps depending on which heaps are locked. This improves the speed of the system as compared to the conventional heap manager that only allocates a single heap in virtual memory.

In this manner, the heap optimization module identifies a specific heap in which to make an allocation. If the specific heap does not contain enough contiguous virtual memory addresses to make the requested allocation, the heap manager "expands" the heap. The heap manager increases the heap size by allocating an additional segment from virtual memory and assigning that segment to be part of the heap. The additional segment need not be contiguous with the initial heap segment since the heap manager is capable of tracking the location of the additional segments within virtual memory and associating those additional segments with the initial heap segment regardless of whether the heap segments are contiguous or not.

If further expansions for this heap were needed, then the added segment size would be doubled so long as there was sufficient contiguous space in virtual memory to do so.

For example, suppose the initial size of the heap was 16 MB and that the first expansion was 1 MB. The size of the heap would be initially expanded to 17 MB. The next expansion segment would be 2 MB thus increasing the heap size to 19 MB. The next expansion segment would be 4 MB, the next 8 MB, 16 MB, 32 MB, 64 MB, 128 MB, and so forth. Thus, the heap expansion algorithm in the heap manager may allocate extremely large additional segments.

Very little of the final very large expansion segment may, in fact, be used. For example, suppose that the final additional segment for a heap was 256 MB. It may be that only 1 MB of this segment is actually used to make allocations. This wastes a large amount of virtual memory, which cannot now be used by other threads within the process. This is compounded by the fact that the other heaps may be doing exactly the same sort of expansions.

Such wasting of virtual memory may be quite acceptable if there is sufficient virtual memory available. However, as mentioned above, in a 32-bit virtual memory addressing scheme, virtual memory is limited to 2 or 3 GB depending on how much virtual memory the operating system uses. In additional, the amount of physical memory in computer systems is tending to increase making it more possible to run out of virtual memory before running out of physical memory. In this context, wasting 255 MB of virtual memory may be undesirable, especially while other threads within the process are unsuccessfully searching for contiguous space in virtual memory in which to make an allocation. Thus, although the heap optimization module improves performance by allowing for heap allocations even if one or more heaps are locked, the heap optimization module may inefficiently use virtual memory space when numerous heap expansions are needed.

An additional problem with the conventional heap optimization module arises from the way that heaps are expanded as the virtual memory approaches complete use and thus as the size of the largest region of available contiguous virtual memory is reduced. There is one notable exception to the rule that expansions are doubled for each subsequent expansion to a given heap. Specifically, if there is simply not enough contiguous virtual memory left for the expansion anywhere in the virtual memory, the proposed expansion size is halved. This halving continues until either a contiguous virtual memory space is found of that size, or the size is already at a minimum acceptable size for an expansion. This minimum acceptable size may be, for example, the smallest virtual memory segment that the virtual memory manager is able to allocate (e.g., 64 KB).

Thus, as virtual memory is close to being completely consumed, the heap expansion sizes are reduced. From this relatively full state, virtual memory will typically be deallocated and released as processes finish using virtual memory. Since the smaller heap expansion segments still remain after the release of other segments of virtual memory, the smaller heap expansion segments may severely fragment the virtual memory thereby limiting future allocations in virtual memory.

Therefore, what are desired are methods and systems for performing heap allocations in a way that permits allocations to be made within a heap even if one or more heaps are currently locked, that more efficiently uses virtual memory, and that reduces the risk of virtual memory fragmentation.

SUMMARY OF THE INVENTION

The present invention permits allocations within heaps even if one or more heaps are currently locked. In addition, the present invention increases the efficiency of virtual memory usage and reduces the risk of virtual memory fragmentation. Instead of incrementally growing a full heap when it is used to make an allocation, the heap optimization module will look for another heap that may have available memory. If all the heaps are full, an entirely new heap will be created automatically and the allocation will be done from the newly created heap. The new heap is of a constant size, and furthermore, is added to the pool of available heaps. Thus, the new heap may be considered for heap allocations from any thread within the process. This reduces the risk that large portions of the heap segment will be unused and thus waste virtual memory. In addition, since the heaps are no longer expanded in potentially small increments, the risk of virtual memory fragmentation is reduced.

In accordance with the present invention, an initial number of non-growable heaps are allocated in the virtual memory. The number of initial heaps may be, for example, three more than the number of processors is the computer system. This initial number may be reconfigured by the user. A heap optimization module may create these initial heaps by calling on functions exposed by a heap manager.

Next, a determination is made that an allocation is to be made within a heap. For example, the heap optimization module may receive an instruction from an application that an allocation within a heap is to be made. If there is enough memory within the initial heaps to make the allocation necessitated by the received instruction, the memory is allocated from one of the initial number of non-growable heaps. However, if there is not enough virtual memory within the initial heaps to make the allocation necessitated by the received instruction, an entirely new heap is created for use in making the allocation necessitated by the received instruction.

Unlike conventional heap allocation methods, the heaps are not incrementally expanded with the incremental expansion size being related to the history of previous expansion sizes. Instead, entirely new heaps are created. The size of the new heaps may be independent of the heap allocation history. For example, instead of allocating a first new heap having a 1 Megabyte size, a second new heap having a 2 Megabyte size, and doubling the size of the expansion whenever an expansion is performed, the size of the new heaps may be relatively fixed size of, for example, 16 Megabytes for each new heap.

Since the heaps are entirely new, the heap is added to the pool of available heaps and thus may be considered by the heap optimization module when deciding which heap to make an allocation to. If all other heaps are full as was the case when the new heap was initially created, then the new heap would receive a higher proportion of new heap allocations. Thus, there would be a greater tendency for memory in the new heap to be used as compared to the conventional method of expanding existing heaps. In addition, since heap expansion is not performed, allocation of relatively small heap expansion segments is avoided. This reduces the risk of virtual memory fragmentation.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to methods, systems, and computer program products for managing heap allocations in a manner that improves the utilization of the multiple heaps and that reduces the risk of virtual memory fragmentation. In accordance with the present invention, a number of heaps are initially allocated. When the initial heaps are fully committed (i.e., there is not enough contiguous space available in any available heap to make a subsequent allocation), additional heaps are allocated rather than expanding the currently existing heaps. The additional heaps may then be added to the pool of heaps available for making smaller allocations.

The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
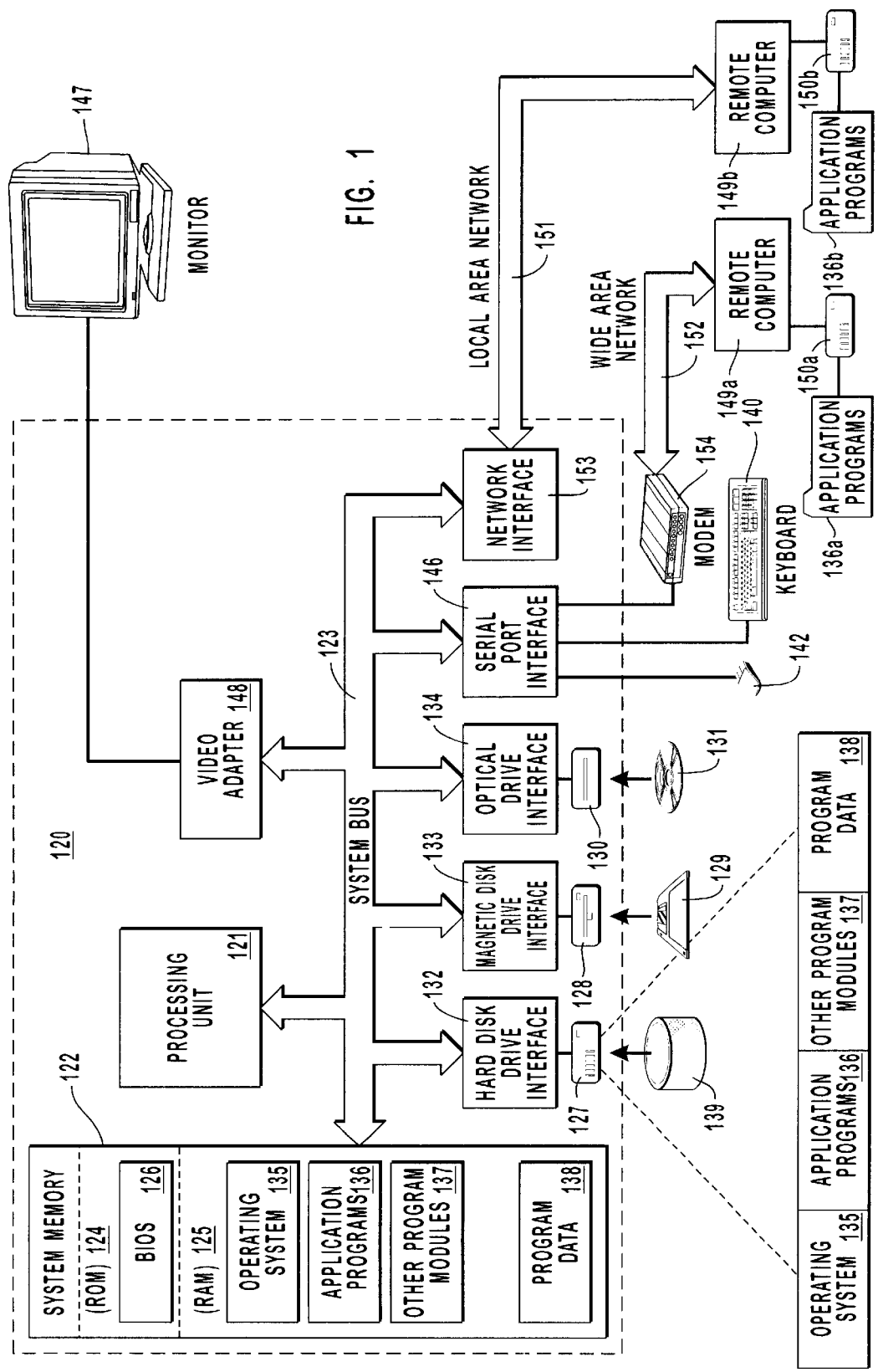
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
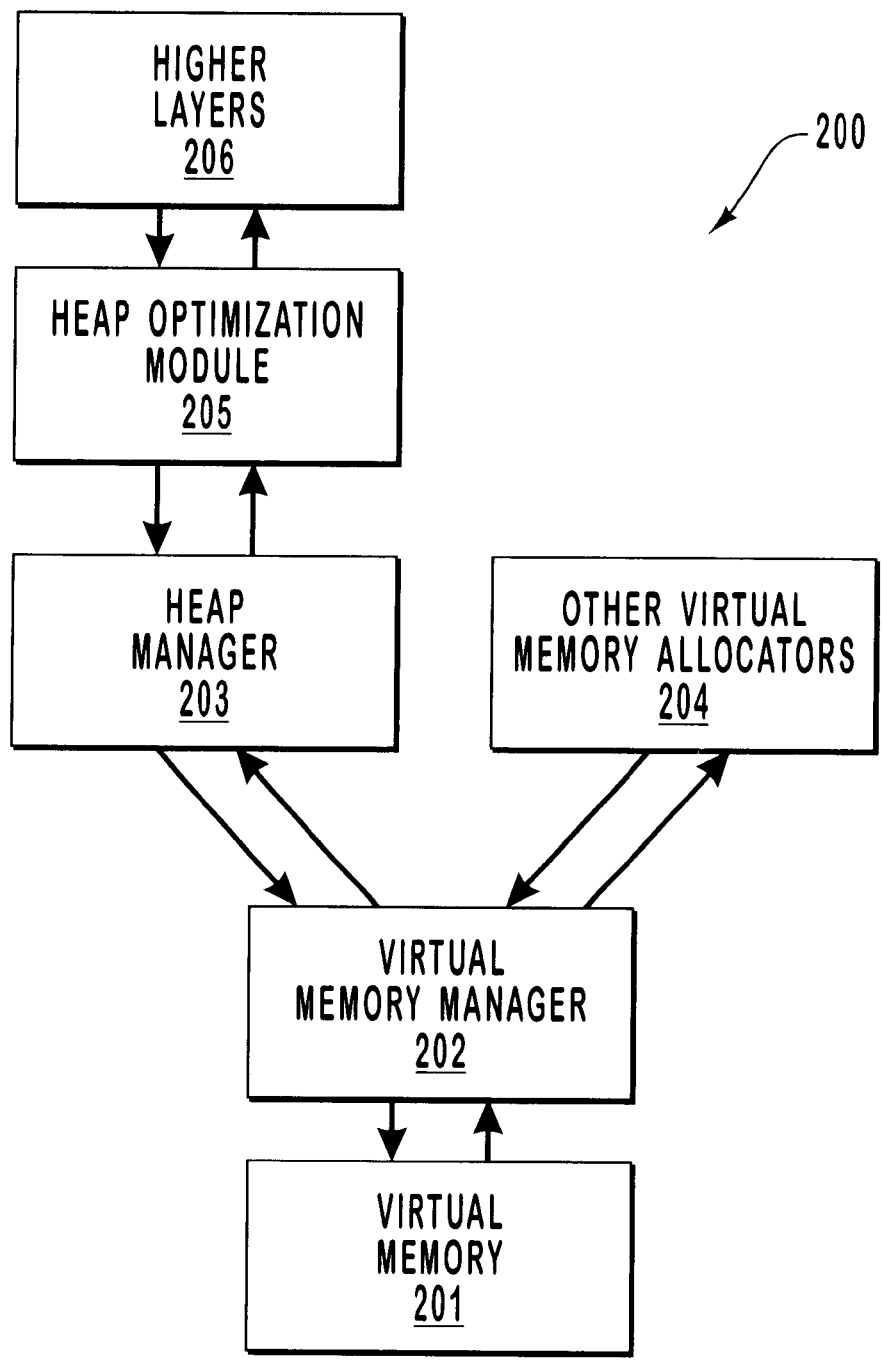
FIG. 2 illustrates a layered architecture that allows structured access to virtual memory.

FIG. 2 schematically illustrates a layered software structure 200 that may be used to interact with a virtual memory such as virtual memory 201. A virtual memory includes a logical series of virtual addresses that may be used to store data. Some of the virtual addresses will at any given time correspond to physical addresses within the system memory such as system memory 122. However, assuming that the virtual memory is larger than the physical system memory, the other virtual address will correspond to data that is stored in permanent memory such as magnetic hard disk 139. The virtual addresses are maintained by the operating system in units called pages. During execution, pages of virtual memory are constantly being transferred or "swapped" back and forth between system memory and permanent storage so as to try to fill the system memory with virtual addresses that will be accessed sooner.

Virtual memory is a way of simulating more memory than actually exists in system memory. Virtual memory requires the use of a virtual memory manager such as virtual memory manager 202. The virtual memory manager 202 allocates virtual memory segments to each process that uses virtual memory. A "virtual memory segment" is a region of contiguous virtual memory addresses. In this context, the virtual memory manager 202 has two primary tasks The first primary task is to translate or "map" each process's virtual address into a physical address so that when a thread (running in the context of that process) performs an operation on a virtual address, the appropriate operation is performed on the corresponding physical address. The second primary task is to page some of the contents of the system memory into permanent storage when running threads or system code try to use more system memory than is currently available, and to bring the contents back into system memory when needed.

Any module that requires virtual memory uses the services of the virtual memory manager 202. One example of a module that uses virtual memory is heap manager 203. Incidentally, there are also typically many other modules such as other virtual memory allocators 204 that use virtual memory 201 The heap manager 203 responds to instructions from higher level modules to allocate large portions or "heaps" of contiguous virtual memory addresses that are to be used by threads during execution. A heap is a segment of virtual memory that is typically made up of one or more pages. The heap manager 203 provides a set of functions that allow for the allocation and deallocation of smaller segments of virtual memory within the heap. The heap manager maintains a list of these smaller segments for each heap. Those smaller segments typically do not need to be an entire page or an integer multiple of a page. For example, the smaller segment may be 8 bytes or an integer multiple of 8 bytes, even if the virtual memory manager is only capable of allocating segments of 64 KB or multiples of 64 KB.

In accordance with the present invention, a heap optimization module 205 provides instructions to the heap manager 203 to allocate a number of heaps of virtual memory. The heap optimization module 205 may respond to directives from higher layers 206 such as application programs 136. The heap optimization module 205 operates to perform heap allocation in a manner that improves virtual memory utilization and reduces the risk of virtual memory fragmentations as compared to conventional heap allocation mechanisms that also permit for heaps to be accessed even if one or more heaps are locked.

Figure 3:
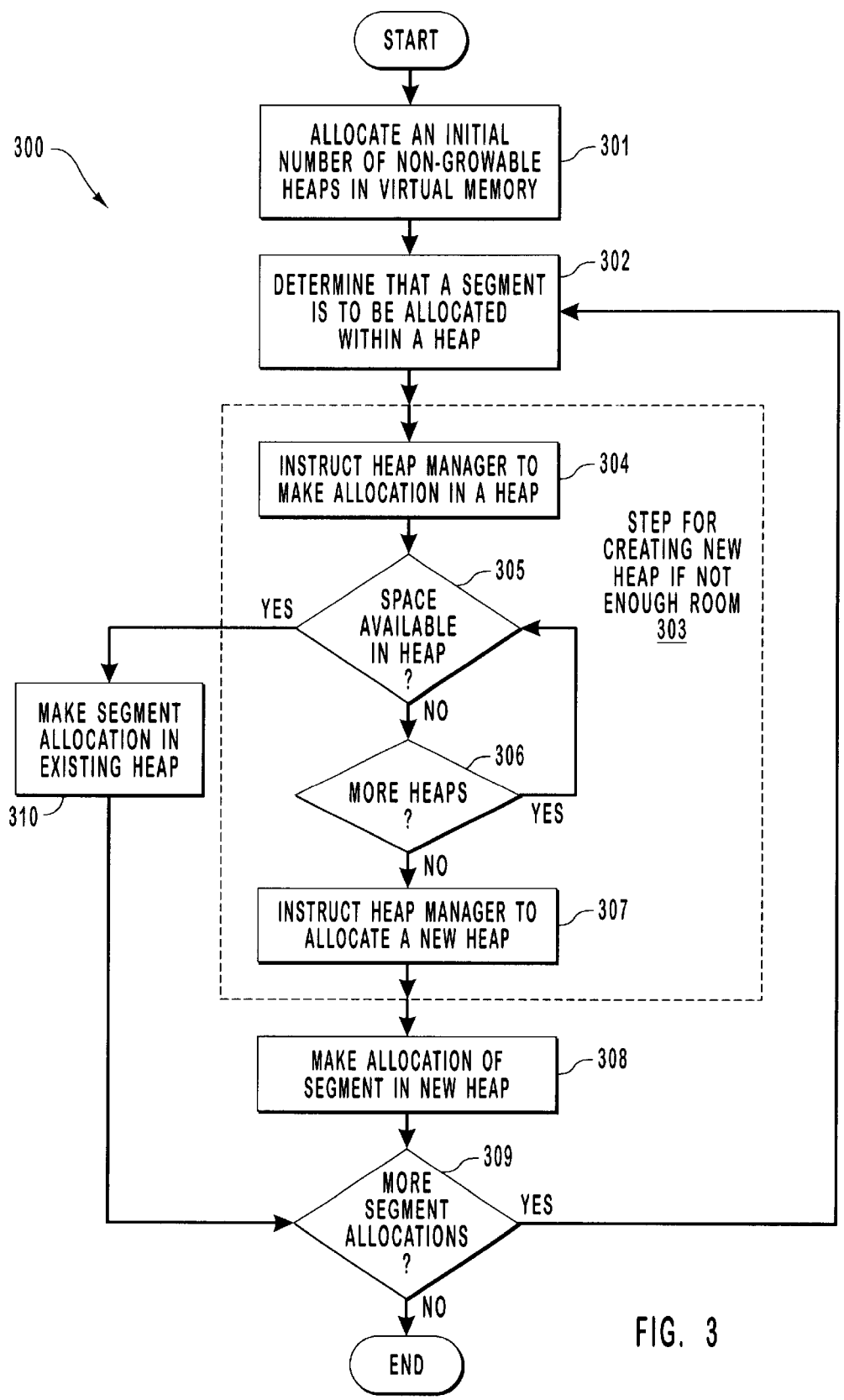
FIG. 3 illustrates a method of performing heap allocation for improved use of virtual memory in accordance with the present invention.

FIG. 3 illustrates a method 300 for performing heap allocation with improved virtual memory usage and reduced risk of virtual memory fragmentation in accordance with the present invention. The method allocates an initial number of "non-growable" heaps in virtual memory (act 301). A "non-growable" heap is a heap that the heap manager cannot associate with any other additional virtual memory segments beyond the virtual memory segment that was allocated to the heap during the initial creation of the heap.

The allocation of non-growable heaps may occur upon powering up the computer 120. This initial allocation may occur by the heap optimization module 205 instructing the heap manager 203 to create a number of heaps. The heap optimization module 205 may also designate the heaps as being non-growable. The heap manager 203 then enforces the non-growable designation by refusing to expand the heap when a requested allocation cannot be made in the heap.

The initial number of heaps may have a default value of three more than the number of processors in the computer 120. Thus, if the computer 120 has two processors, five heaps would be initially allocated. This default number of initial heaps may be 2 reconfigured, if desired, by the user. Conventional heaps may have an initial size of approximately 16 MB. However, in an example embodiment, the aggregate initial heap size is the smaller of 600 MB or 20% of the physical memory size. For example, in a system that has available 2 GB of physical memory, the total size of all the initial heaps would be 400 MB (20% of 2 GB). Since there are five heaps initially allocated, each heap would be 80 MB (400 MB÷5).

Figure 4:
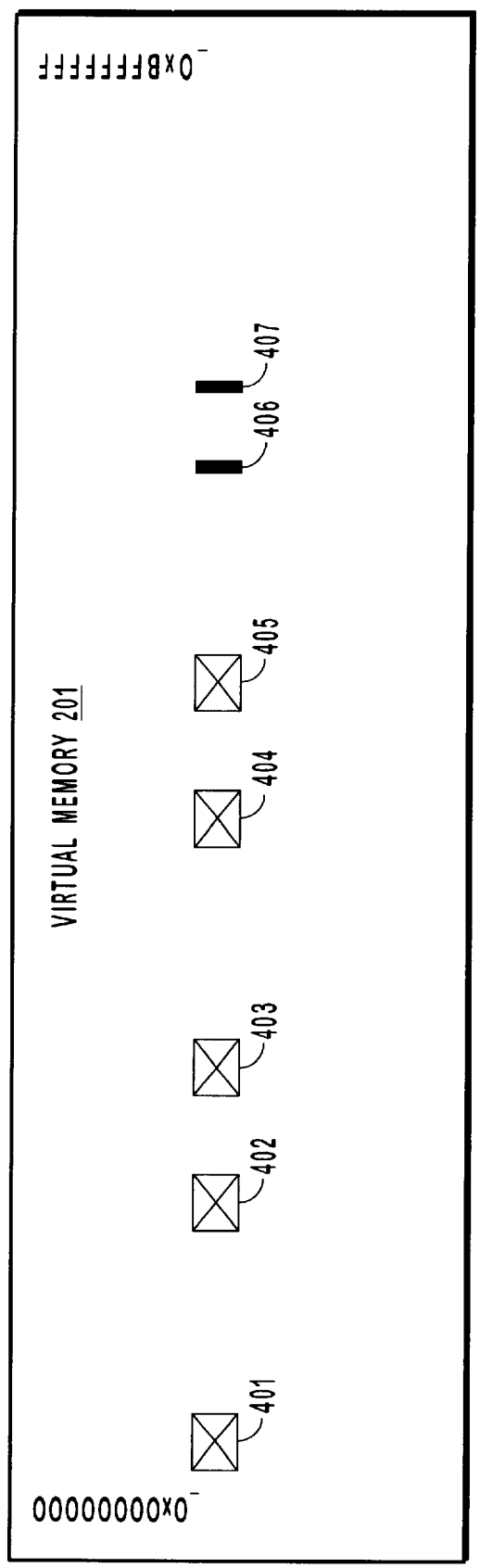
FIG. 4 schematically illustrates an example layout of the virtual memory with heaps allocated therein.

FIG. 4 illustrates virtual memory 201, which includes 3 Gig of contiguous virtual addresses having addresses that range from 0x00000000 to 0xBFFFFFFF. The memory spaces allocated to the initial five heaps are illustrated as boxes 401 through 405. The boxes are marked with an "X" representing that these heaps are the heaps that are initially allocated.

It will be understood that heaps are just one example of a virtual memory allocation. Other types of virtual memory allocation such as thread stacks often occur, but are not shown in FIG. 4 so as to avoid obscuring the principles of the present invention. Since these other virtual memory allocations are not shown in the virtual memory 201 of FIG. 4, it will appear as though the virtual memory 201 is relatively unused in FIG. 4. However, note that many other virtual memory allocators 204 compete for virtual memory allocation thus often pushing the limits of even virtual memory having 3 Gig of virtual memory addresses.

One differing aspect of the present invention, as compared to the convention heap optimization module, is that the initially allocated heaps are non-growable. This means that if none of the initial heaps 401 through 405 contain enough contiguous virtual memory space to make an allocation, the heaps are not expanded to accommodate the allocation. Instead, entirely new heaps are created. The heap manager 203 does not associate those new heaps with any of the initial "non-growable" heaps. Instead, they are separately tracked as being an additional heap available for making allocations. FIG. 4 illustrates that two additional heaps of approximately 16 Meg size have been allocated in memory. These new heaps 406 and 407 are filled in solid to identify them as being new heaps.

Returning to FIG. 3, once the initial non-growable heaps are allocated (act 301), the heap optimization module 205 will receive directives from the higher layers 206 to allocate segments within a heap. Every time the heap optimization module 205 receives such a directive, it determines that a segment is to be allocated within a heap (act 302). Thus, the method of FIG. 3 is continued starting at act 302 for each directive that indicates an allocation is to be made.

The heap optimization module 205 then performs a step for creating a new heap if there is not enough contiguous space in any available heap to make the allocation (step 303). In the embodiment illustrated in FIG. 3, this step includes corresponding act 304, decision block 305, decision block 306, and act 307.

Specifically, the heap optimization module 205 instructs the heap manager 203 to allocate the segment in a heap (act 304). The heap optimization module 205 may identify the initial heap in which to attempt allocation by selecting any heap that is not locked. If there is no contiguous space available within the heap in which to make the allocation (NO in decision block 305), then the heap manager 203 will return an out of memory error to the heap optimization module 205. In contrast, in the conventional method, the heap manager would have expanded the heap by allocating an additional virtual memory segment to that heap and then would have made the allocation in the expanded segment of the heap. If an out of memory error occurs for that heap (NO in decision block 305), the heap optimization module 205 then determines whether or not it has checked all heaps to see if the allocation can be made (decision block 306).

If there are more heaps to check (YES in decision block 306), then the heap optimization module 205 checks the next heap to determine if there is enough contiguous space in which to make the allocation Specifically, the heap optimization module 205 instructs the heap manager 203 to make the allocation in the next heap (returning to act 304). If the next heap is locked, the heap manager 203 waits until the next heap is unlocked before checking for contiguous space.

The heap optimization module 205 would repeat this process until a heap is found in which to make the requested allocation (YES in decision block 305), in which case the heap manager 203 would make the allocation in that heap (act 310). However, if no heap is found in which there is sufficient contiguous space in which to make the allocation (NO in decision block 306), then the heap optimization module 205 instructs the heap manager 203 to allocate an entirely new heap (act 307), thus completing the step for creating a new heap if there is not enough room in any available heap to make the allocation (step 303). The heap manager 203 then makes the allocation in the new heap (act 308). This new heap then joins the pool of heaps available for further allocations by the heap manager regardless of what process initiates the further allocations.

If there are more segments to be allocated (YES in decision block 309), then the method repeats starting at the determination that a segment is to be allocated within a heap (act 302). Otherwise (NO in decision block 309), the method ends. Typically, if the system is powered up, there may always be more segments to be allocated (YES in decision block 309) since the use of heap memory is critical to many processes.

Although the heap optimization module 205 is illustrated in FIG. 2 as being a separate component from the heap manager 203, some or all of the functionality described above as being attributed to the heap optimization module 205 may instead be implemented directly by the heap manager 203. Thus, instead of instructing the heap manager 203 to make an allocation of a segment in act 304 and instructing the heap manager 203 to allocate a new heap in act 307, the heap manager 203 may be configured to perform such acts directly and without instruction.

Like the conventional heap optimization module, the heap optimization module in accordance with the present invention still allows for an allocation to be made in a heap despite one or more heaps being locked at the time of the allocation. However, unlike the conventional heap optimization module, the heaps are not expanded. Instead entirely new heaps are created. Since the heaps are entirely new, the heap is added to the pool of available heaps and thus may be considered by the heap optimization module when deciding which heap to make an allocation to. If all other heaps are full as was the case when the new heap was initially created, then the new heap would receive a higher proportion of new heap allocations. Thus, there would be a greater tendency for memory in the new heap to be used as compared to the conventional method of expanding existing heaps.

In addition, the present invention reduces the risk of virtual memory fragmentation as compared to the conventional heap optimization module. This is due in part to the fact that incrementally small heap expansion segments are avoided. In addition, since the new heap is added to the pool of heaps which are available for allocation, subsequent new heaps are only added after even the new heaps are full. Thus, the number of additional segments that need to be allocated from virtual memory to support heap management is significantly reduced, thereby reducing the risk of virtual memory fragmentation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system capable of allocating heaps in virtual memory, a method of allocating non-growable heaps in virtual memory so as to increase the usage efficiency of the virtual memory and so as to reduce fragmentation of the virtual memory, the method comprising the following:

an act of creating an initial number of non-growable heaps in the virtual memory, the non-growable heaps each being a heap that a heap manager cannot associate with any other additional virtual memory segments beyond the virtual memory segment that was initially allocated to the heap during creation;

an act of receiving an instruction that requires allocation of virtual memory within one or more heaps;

if there is enough virtual memory within any available heap of the initial number of non-growable heaps in which to make the allocation necessitated by the received instruction, an act of allocating memory from one or more of the initial number of non-growable heaps; and if there is not enough virtual memory within any available heap of the initial number of non-growable heaps in which to make the allocation necessitated by the received instruction, an act of creating a new heap for use in making the allocation necessitated by the received instruction.

2. A method in accordance with claim 1, wherein the act of creating an initial number of non-growable heaps in the virtual memory comprises the following:

an act of a heap optimization module instructing a heap manager to create the initial number of non-growable heaps in the virtual memory.

3. A method in accordance with claim 1, further comprising an act of determining if there is enough virtual memory within any available heap of the initial heaps in which to make the allocation.

4. A method in accordance with claim 3, wherein the act of determining if there is enough virtual memory within any available heap of the initial heaps in which to make the allocation comprises the following:

an act of a heap optimization module instructing a heap manager to determine if allocation is possible in a first initial heap;

an act of the heap optimization module receiving an indication from the heap manager as to whether the allocation is possible in the first initial heap; and if the heap manager indicates that allocation is not possible in the first initial heap, an act of repeating the act of the heap optimization module instructing and the act of the heap optimization module receiving for each additional initial heap until the heap manager indicates the success of the allocation in an initial heap, or until the heap manager has indicated that all of the remaining initial heaps are not available for the allocation.

5. A method in accordance with claim 1, wherein the act of creating a new heap for use in making the allocation necessitated by the received instruction comprises the following:

an act of creating a new non-growable heap for use in making the allocation.

6. A method in accordance with claim 1, wherein the act of creating an initial number of non-growable heaps in the virtual memory comprise the following:

an act of determining the number of processors in the computer system; and an act of creating three more non-growable heaps than the number of processors.

7. In a computer system capable of allocating heaps in virtual memory, a method of allocating non-growable heaps in virtual memory so as to reduce fragmentation of the virtual memory, the method comprising the following:

an act of creating an initial number of non-growable heaps in the virtual memory, the non-growable heaps each being a heap that a heap manager cannot associate with any other additional virtual memory segments beyond the virtual memory segment that was initially allocated to the heap during creation;

an act of receiving an instruction that requires allocation of virtual memory within one or more heaps; and a step for making the allocation in a new heap if there is not enough room in any available heap of the initial non-growable heaps in which to make the allocation.

8. A method in accordance with claim 7, wherein the act of creating an initial number of non-growable heaps in the virtual memory comprises the following:

an act of a heap optimization module instructing a heap manager to create the initial number of non-growable heaps in the virtual memory.

9. A method in accordance with claim 7, further comprising an act of determining if there is enough virtual memory within any available heap of the initial non-growable heaps in which to make the allocation.

10. A method in accordance with claim 9, wherein the act of determining if there is enough virtual memory within any available heap of the initial heaps in which in make the allocation comprises the following:

an act of a heap optimization module instructing a heap manager to determine if allocation is possible in a first initial heap;

an act of the heap optimization module receiving an indication from the heap manager as to whether the allocation is possible in the first initial heap; and if the heap manager indicates that allocation is not possible in the first initial trap, an act of repeating the act of the heap optimization module instructing and the act of the heap optimization module receiving for each remaining initial heap until the heap manager indicates the success of the allocation in an initial heap, or until the heap manager has indicated that all of the remaining initial heaps are not available for the allocation.

11. A method in accordance with claim 7, further comprising the following:

an act of creating a new heap for use in making the allocation necessitated by the received instruction.

12. A method in accordance with claim 11, wherein the act of creating a new heap for use in making the allocation necessitated by the received instruction comprises the following:

an act of creating a new non-growable heap for use in making the allocation.

13. A method in accordance with claim 7, wherein the act of creating an initial number of non-growable heaps in the virtual memory comprise the following:

an act of determining the number of processors in the computer system; and an act of creating three more non-growable heaps than the number of processors.

14. A computer-program product for use in a computer system capable of allocating heaps in virtual memory, the computer-program product for implementing a method of allocating non-growable heaps in virtual memory so as to reduce fragmentation of the virtual memory, the computer program product comprising a computer-readable medium having stored thereon the following:

a virtual memory manager configured to map virtual memory addresses to physical memory addresses;

a heap manager configured to allocate heaps in virtual memory by using the virtual memory manager to access virtual memory;

a heap optimization module configured to perform the following:

an act of instructing a heap manager to create an initial number of non-growable heaps in the virtual memory the non-growable heaps each being a heap that a heap manager cannot associate with any other additional virtual memory segments beyond the virtual memory segment that was initially allocated to the heap during creation;

an act of receiving an instruction that requires allocation of virtual memory within one or more heaps;

an act of instructing the heap manager to make the allocation necessitated by the received instruction in one or more of the initial heaps;

an act of receiving an indication from the heap manager that there is not enough virtual memory available in the initial heaps to make the allocation necessitated by the received instruction; and in response to the indication from the heap manager, an act of instructing the heap manager to create a new heap within the virtual memory.

15. The computer program product in accordance with claim 14, wherein the computer-readable medium is one or more physical store media.

16. In a computer program product for use in a computer system capable of allocating heaps in virtual memory, a computer program product for implementing a method of allocating non-growable heaps in virtual memory so as to reduce fragmentation of the virtual memory, the computer program product comprising a computer-readable medium having stored thereon computer-executable instructions for implementing the following:

an act of causing an initial number of non-growable heaps to be created in the virtual memory, the non-growable heaps each being a heap that a heap manager cannot associate with any other additional virtual memory segments beyond the virtual memory segment that was initially allocated to the bean during creation;

an act of detecting the receipt of an instruction that requires allocation of virtual memory within one or more heaps;

if there is enough virtual memory within any available heap of the initial number of non-growable heaps in which to make the allocation necessitated by the received instruction, an act causing memory to be allocated from one or more of the initial number of non-growable heaps; and if there is not enough virtual memory within any available heap of the initial number of non-growable heaps in which to make the allocation necessitated by the received instruction, an act of causing a new heap to be created far use in making the allocation necessitated by the received instruction.

17. A computer program product in accordance with claim 16, wherein the computer-executable instruction for performing the act of causing an initial number of non-growable heaps to be created in the virtual memory comprise computer-executable instructions for performing the following:

an act of instructing a heap manager to create the initial number of non-growable heaps in the virtual memory.

18. A computer program product in accordance with claim 16, wherein the computer-readable medium further has stored thereon computer-executable instructions for performing an act of determining if there is enough virtual memory within any available heap of the initial number of non-growable heaps in which to make the allocation.

19. A computer program product in accordance with claim 18, wherein the computer-executable instructions for performing the act of determining if there is enough virtual memory within any available heap of the initial number of non-growable heaps in which to make the allocation comprises computer-executable instructions for performing the following:

an actor instructing a heap manager to determine if allocation is possible in a first initial heap;

an act of detecting the receipt of an indication from the heap manager as to whether the allocation is possible in the first initial heap; and if the heap manager indicates that allocation is not possible in the first initial heap, an act of repeating the act of instructing and the act of detecting the receipt for each additional initial heap until the heap manager indicates the success of the allocation in an initial heap, or until the heap manager has indicated that all of the remaining initial heaps are not available for the allocation.

20. A computer program product in accordance with claim 16, wherein the computer-executable instruction for performing the act of causing an new heap to be created for use in making the allocation necessitated by the received instruction comprise computer-executable instructions for performing the following:

an act of causing a new non-growable heap to be created for use in making the allocation.

21. A computer program product in accordance with claim 16, wherein the computer-executable instructions for performing the act of causing an initial number of non-growable heaps in be created in the virtual memory comprise the following:

an act of determining the number of processors in the computer system; and an act of causing three more non-growable heaps than the number of processors to be created.

22. The computer program product in accordance with claim 16, wherein the computer-readable medium is one or more physical storage media.

* * * * *

UNITED STATES PATENT AND TRADEMARK OFFICE
CERTIFICATE OF CORRECTION

PATENT NO. : 6,643,753 B2
DATED : November 4, 2003
INVENTOR(S) : Avner et al.

It is certified that error appears in the above-identified patent and that said Letters Patent is hereby corrected as shown below:

Column 8,
Line 51, after "tasks" please insert -- . --

Column 9,
Line 6, after "memory 201" please insert -- . --
Line 58, after "may be" please delete "2"

Column 11,
Line 4, after "allocation" please insert -- . --

Column 13,
Line 49, after "in which" please delete "in" and insert -- to --
Line 59, after "initial" please delete "trap" and insert -- heap --

Column 14,
Line 52, after "physical" please delete "store" and insert -- storage --
Line 67, after "to the" please delete "bean" and insert -- heap --

Column 15,
Line 14, after "created" please delete "far" and insert -- for --

Column 16,
Line 1, after "an" please delete "actor" and insert -- act of --
Line 16, after "causing" please delete "an" and insert -- a --

Signed and Sealed this

Twenty-fifth Day of May, 2004

JON W. DUDAS
*Acting Director of the United States Patent and Trademark Office*